US011050357B2

(12) United States Patent
Mangold et al.

(10) Patent No.: US 11,050,357 B2
(45) Date of Patent: Jun. 29, 2021

(54) MODULAR MULTILEVEL POWER CONVERTER IN WHICH ELECTRONIC COMPONENTS OF THE CONVERTER ARE ARRANGED ON DIFFERENT VEHICLES

(71) Applicant: SIEMENS AKTIENGESELLSCHAFT, Munich (DE)

(72) Inventors: Thomas Mangold, Erlangen (DE); Martin Pieschel, Nuremberg (DE); Uwe Stuermer, Baiersdorf (DE); Tobias Tepe, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/487,627

(22) PCT Filed: Feb. 21, 2017

(86) PCT No.: PCT/EP2017/053916
§ 371 (c)(1),
(2) Date: Aug. 21, 2019

(87) PCT Pub. No.: WO2018/153433
PCT Pub. Date: Aug. 30, 2018

(65) Prior Publication Data
US 2020/0067421 A1   Feb. 27, 2020

(51) Int. Cl.
*H02M 7/515* (2007.01)
*H02M 7/00* (2006.01)
*H02M 7/483* (2007.01)

(52) U.S. Cl.
CPC ......... *H02M 7/5152* (2013.01); *H02M 7/003* (2013.01); *H02M 2007/4835* (2013.01)

(58) Field of Classification Search
CPC ............... H02M 7/5152; H02M 7/003; H02M 2007/4835
See application file for complete search history.

(56) References Cited

U.S. PATENT DOCUMENTS

| 10,700,617 B1* | 6/2020 | Moustafa Abdelrazek ................. H02M 7/49 |
| 2007/0093280 A1* | 4/2007 | McKay ...................... H02J 7/00 455/574 |
| 2010/0091434 A1 | 4/2010 | Pereira et al. |
| 2013/0009591 A1* | 1/2013 | Demetriades ............. H02J 7/35 320/101 |

(Continued)

FOREIGN PATENT DOCUMENTS

| CN | 202772592 U | 3/2013 |
| CN | 202840300 U | 3/2013 |
| CN | 202978747 U | 6/2013 |

(Continued)

*Primary Examiner* — Kyle J Moody
*Assistant Examiner* — Lakaisha Jackson
(74) *Attorney, Agent, or Firm* — Laurence Greenberg; Werner Stemer; Ralph Locher

(57) ABSTRACT

A modular multilevel power converter includes first electric components on a first vehicle and second electric components on a second vehicle. The first vehicle and the second vehicle are placed at a spacing distance from each other. The first electric components and the second electric components are electrically interconnected by a plurality of first connecting conductors.

19 Claims, 9 Drawing Sheets

(56) References Cited

U.S. PATENT DOCUMENTS

2020/0235582 A1\* 7/2020 Helling ................ H02M 7/483
2021/0044216 A1\* 2/2021 Riar ....................... H02M 1/12

FOREIGN PATENT DOCUMENTS

WO        2008098530 A1    8/2008
WO        2010118772 A1    10/2010
WO    WO-2010118772 A1 \* 10/2010 ............ H02J 3/1857

\* cited by examiner

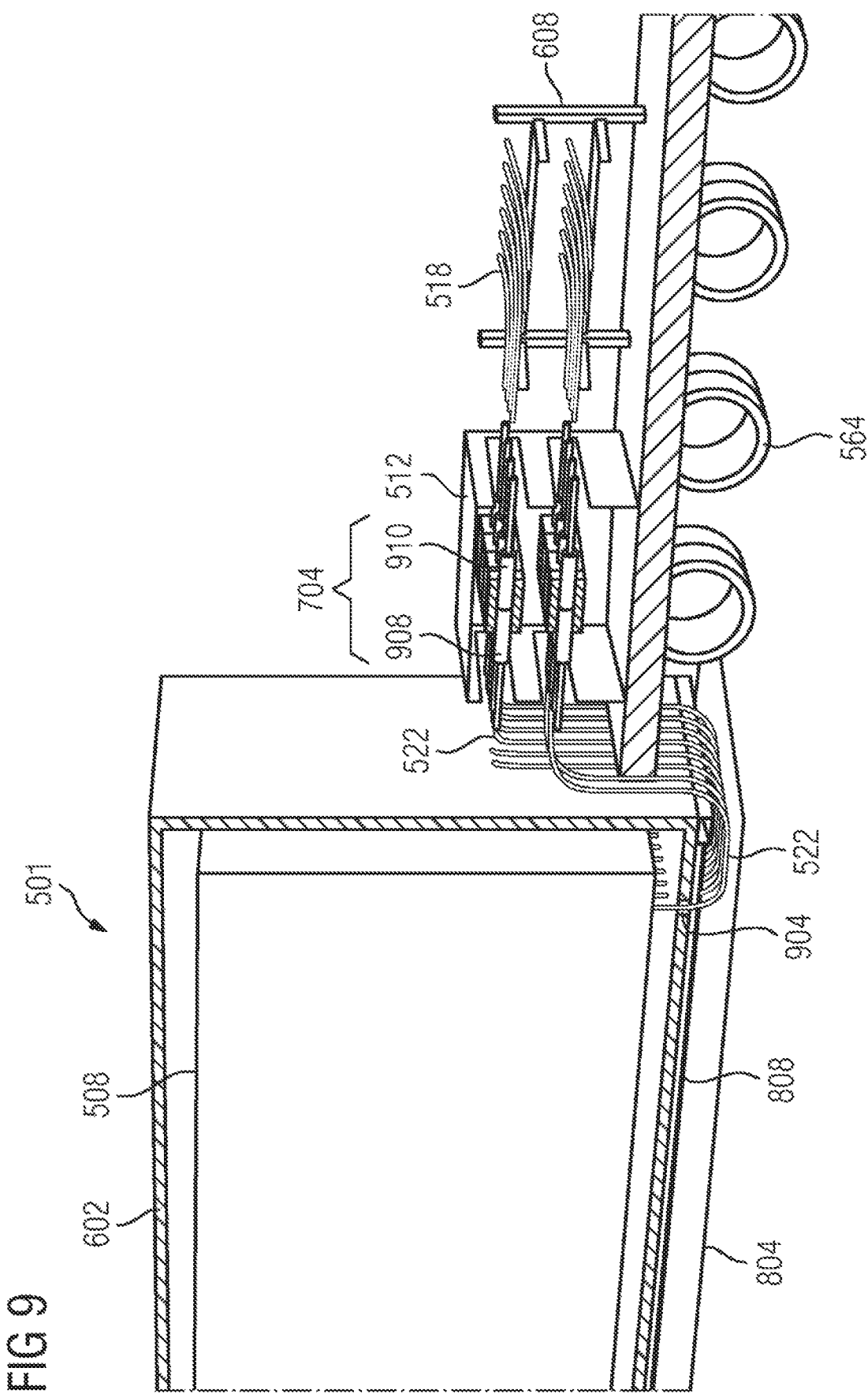

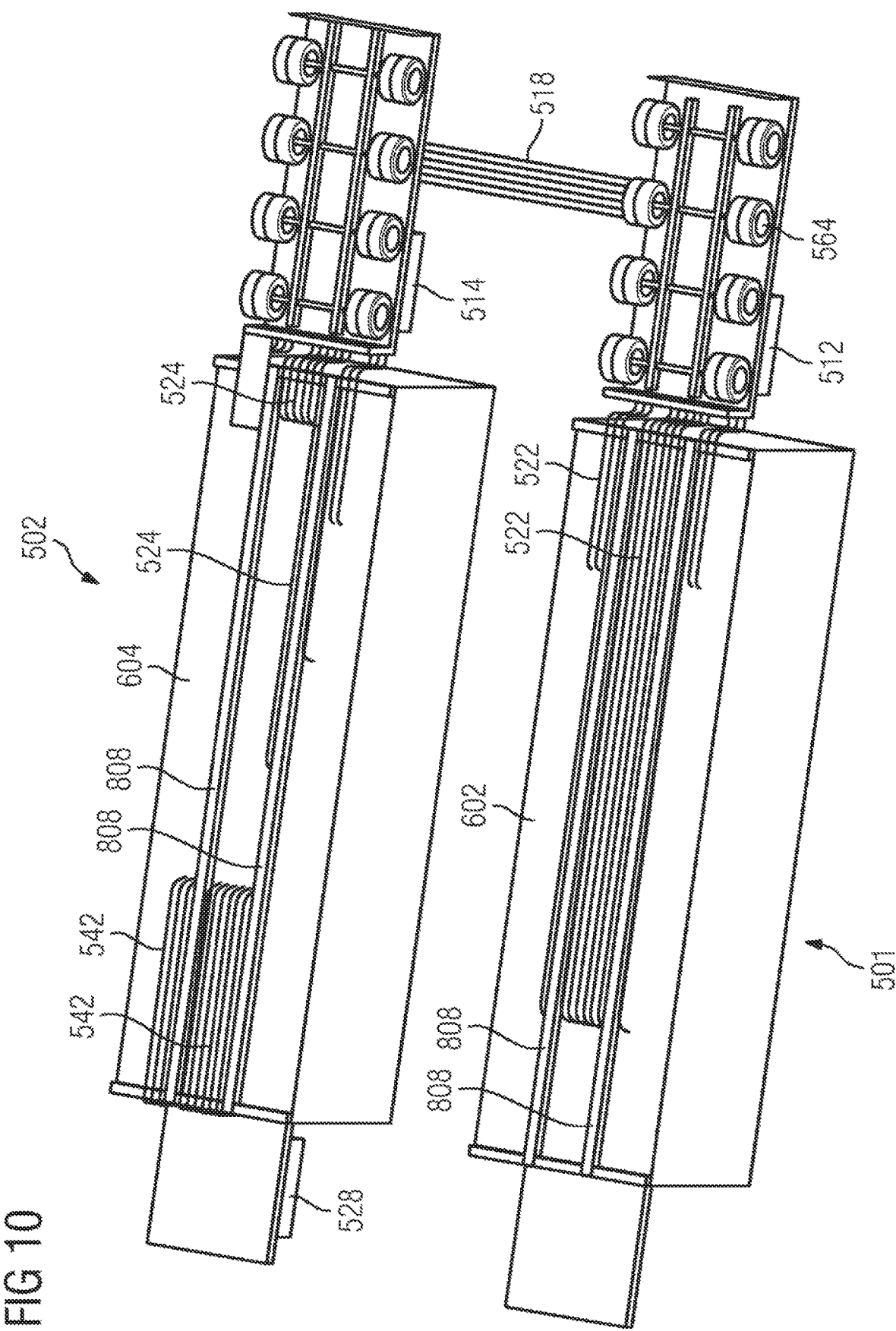

MODULAR MULTILEVEL POWER CONVERTER IN WHICH ELECTRONIC COMPONENTS OF THE CONVERTER ARE ARRANGED ON DIFFERENT VEHICLES

BACKGROUND OF THE INVENTION

Field of the Invention

A modular multilevel power converter is a power-electronics circuit for converting electrical energy. With a modular multilevel power converter, alternating current can, for instance, be converted into direct current, and direct current can be converted into alternating current. A modular multilevel power converter exhibits a large number of modules of similar type, which are electrically connected in series. By virtue of the electrical series connection of the modules, high output voltages can be obtained. A modular multilevel power converter can be easily adapted (scaled) to different voltages, and a desired output voltage can be generated relatively precisely. A modular multilevel power converter can be employed advantageously within the high-voltage range, for instance as a power converter in a high-voltage DC transmission system or as a reactive-power compensation system.

Modular multilevel power converters that are suitable for the high-voltage and medium-voltage ranges often have a considerable size. The fixed construction of such a modular multilevel power converter represents a major investment project and often takes a relatively long time. Causes of this are, for instance, that lengthy advance planning is necessary, that foundations have to be prepared, buildings have to be built, and cables have to be laid. These structural measures are often associated with protracted planning and approval procedures.

SUMMARY OF THE INVENTION

The object underlying the invention is to specify a modular multilevel power converter and a method for influencing electric current by means of a modular multilevel power converter, said converter and said method being able to be realized quickly at the desired site of deployment.

In accordance with the invention, this object is achieved by a modular multilevel power converter and by a method as claimed in the independent claims. Advantageous embodiments of the multilevel power converter and of the method are specified in the dependent claims.

A modular multilevel power converter is disclosed
  with first electrical components which are arranged on a first vehicle, in particular on a first truck trailer,
  with second electrical components which are arranged on a second vehicle, in particular on a second truck trailer,
  the first vehicle and the second vehicle having been set up so as to be spaced apart from one another and
  the first electrical components and the second electrical components having been electrically connected to one another by means of several first (electrical) connecting conductors.

In this case, it is advantageous that the first electrical components and the second electrical components have each been arranged on a vehicle. As a result, the first and the second electrical components can each be quickly transported by the vehicle to the desired site of deployment. Furthermore, it is advantageous that the components remain on the respective vehicle also during the operation of the multilevel power converter. For the purpose of operating the multilevel power converter, the first vehicle and the second vehicle have been set up so as to be spaced apart from one another, and the first electrical components and the second electrical components have been electrically connected to one another by means of the first connecting conductors. As a result, it is advantageously not necessary to erect foundations, buildings or similar infrastructure units. The associated planning and approval procedures can also be dispensed with. This makes it possible to install the modular multilevel power converter and to bring it into service very quickly at its desired site of deployment. Furthermore, it is advantageous that modular multilevel power converters with large and heavy electrical components can also be realized in this way, because the components have been distributed over several vehicles. When required, the multilevel power converter may, of course, also feature more than two vehicles which have been electrically connected to one another by means of connecting conductors. The term "electrical components" within the context of the description is used for classical electrical components such as, for instance, coils, switches or resistors, and also for electronic components such as, for instance, transistors, IGBTs or circuits.

The modular multilevel power converter may advantageously have been configured in such a way that
  the first electrical components exhibit an (electrical) series connection of modules, said modules each exhibiting at least two electronic switching elements and an electrical energy-storage device,
  and the second electrical components exhibit at least one electrical coil. In this embodiment, essential electrical components have been arranged on the first vehicle and on the second vehicle, in order to realize a single-phase or multi-phase multilevel power converter.

The modular multilevel power converter may also have been configured in such a way that
  the first electrical components are arranged in a first container which is fastened to the first vehicle and/or
  the second electrical components are arranged in a second container which is fastened to the second vehicle.

For instance, the modular multilevel power converter may have been configured in such a way that
  the series connection of modules is arranged in a first container which is fastened to the first vehicle and/or
  the coil is arranged in a second container which is fastened to the second vehicle. The first container and the second container advantageously each constitute a housing of the multilevel power converter; they protect the first electrical components and the second electrical components from environmental influences. In addition, the containers also protect the environment of the multilevel power converter from potentially dangerous physical quantities that arise at the multilevel power converter, such as, for instance, from high voltages, large currents or strong electromagnetic fields.

The multilevel power converter may have been set up in such a way that
  a first electrical interface for connecting up the first connecting conductors is arranged at a first end of the first vehicle and/or
  a second electrical interface for connecting up the first connecting conductors is arranged at a first end of the second vehicle.

By means of the first interface and the second interface, the first electrical components and the second electrical components can advantageously be electrically connected to one another. In this case it is advantageous that the first electrical interface and the second electrical interface have each been arranged at a first end of the respective vehicle. As a result, when connecting up the first connecting conductors one is very variable: the first connecting conductors can be led away from the vehicle both parallel to the direction of travel and at a right angle to the direction of travel. In particular, the first connecting conductors can advantageously be led away from the vehicle in a straight line, since by virtue of the terminal arrangement of the interface on the vehicle there is sufficient space in several directions for the rectilinear laying of the first connecting conductors.

The multilevel power converter may have been configured in such a way that the first electrical interface exhibits several detachable electrical contact pairs which each exhibit a first electrical contact and a second electrical contact, the first contacts being electrically connected to the first electrical components, and the second contacts being electrically connected respectively to one of the first connecting conductors and/or the second electrical interface exhibits several detachable electrical contact pairs which each exhibit a first electrical contact and a second electrical contact, the first contacts being electrically connected to the second electrical components, and the second contacts being electrically connected respectively to one of the first connecting conductors. Advantageously, the two interfaces accordingly each exhibit several detachable contact pairs. In this case, it is particularly advantageous that at the time of the construction of the multilevel power converter at the site of deployment merely the mutually assigned first contacts and second contacts have to be connected to one another. The electrical connection between the first contacts and the first electrical components (accordingly, the vehicle-side electrical connection) can already be completely established and tested at the time of the installation of the components on the respective vehicle. This can be done in a workshop; at the site of deployment of the multilevel power converter it is not necessary to change and/or test these (vehicle-side) electrical connections. As a result, the multilevel power converter can be constructed and/or put into operation at the site of deployment very easily, quickly and with few personnel.

The multilevel power converter may have been configured in such a way that the electrical contact pairs have each been configured as a plug connector. By means of plug connectors, the electrical connecting conductors can be connected particularly easily and quickly to the electrical components located on the respective vehicle.

The multilevel power converter may have been configured in such a way that the first contacts of the first electrical interface are electrically connected to the first electrical components by means of first electrical cables which extend, at least in some sections, along the underside of the first vehicle and have been guided into an interior space of the first container through recesses arranged on the underside of the first container and/or the first contacts of the second electrical interface are electrically connected to the second electrical components by means of second electrical cables which extend, at least in some sections, along the underside of the second vehicle and have been guided into an interior space of the second container through recesses arranged on the underside of the second container. In this case, it is particularly advantageous that the first electrical cables are protected on the underside of the first vehicle and have been laid so as to be secure against inadvertent change or damage. Furthermore, it is advantageous that the first electrical cables have been introduced into the interior space of the first container through recesses arranged on the underside of the first container. As a result, no moisture or only little moisture (rain, snow or the like) is able to penetrate into the first container through these recesses. These advantages also hold, of course, for the second container correspondingly.

The multilevel power converter may have been configured in such a way that the modular multilevel power converter exhibits a transformer which is arranged on a third vehicle, in particular on a third truck trailer, the third vehicle and the second vehicle having been set up so as to be spaced apart from one another and the transformer and the second electrical components being electrically connected to one another by means of several second (electrical) connecting conductors. In this case, it is particularly advantageous that the modular multilevel power converter exhibits its own transformer and is consequently independent of a permanently installed transformer at the site of deployment. As a result, the deployment options of the multilevel power converter are distinctly increased, and the modular multilevel power converter can be adapted to an extremely wide range of voltage levels by choice of a suitable transformer.

The multilevel power converter may also have been configured in such a way that a third electrical interface for connecting up the second connecting conductors is arranged at a second end of the second vehicle and the second connecting conductors are (electrically) connected to the third electrical interface. In this case, it is particularly advantageous that on the second vehicle the third electrical interface and the second electrical interface have also been spatially separated from one another, and therefore mix-ups when connecting up the connecting conductors are avoided. In addition, by virtue of the arrangement of the third electrical interface and of the second electrical interface at two (opposite) ends of the second vehicle, the necessary length of the connecting conductors can be minimized.

The multilevel power converter may also have been configured in such a way that the first electrical interface, the second electrical interface and the third electrical interface are constructed identically. In this case, it is particularly advantageous that the electrical connecting of the individual interfaces by means of electrical connecting conductors at the site of deployment is distinctly simplified. The personnel located at the site of deployment need to understand the principle of the interface only once, and they can then electrically connect the electrical components arranged on the vehicles to one another easily and quickly by means of the connecting conductors.

The multilevel power converter may also have been configured in such a way that the modular multilevel power converter exhibits a cooling device which is arranged on a fourth vehicle, in particular on a fourth truck trailer, the fourth vehicle and the first vehicle having been set up so as to be spaced apart from one another and the cooling device and the first vehicle being connected to one another by means of at least one coolant line. The cooling device arranged on the fourth vehicle makes it possible to cool the multilevel power converter effectively, and therefore to use it even in the case of high electrical powers which are needed.

The multilevel power converter may also have been configured in such a way that the two electronic switching elements of the modules are arranged in a half-bridge circuit, and/or the modules each exhibit the two electronic switching elements and two further electronic switching elements, the two electronic switching elements and the two further electronic switching elements being arranged in a full-bridge circuit. By means of these half-bridge circuits and/or full-bridge circuits, diverse configurations of multilevel power converters can be realized.

The multilevel power converter may also have been configured in such a way that the modular multilevel power converter features at least two first vehicles, the first electrical components arranged respectively on the two first vehicles having been assigned respectively to a different phase of the multilevel power converter.

With a multilevel power converter of such a type, preferably very high electrical powers can be processed.

For this purpose, the electrical components of each electrical phase have been arranged on one or more first vehicles assigned to this phase. As a result, a modular multilevel power converter with very large and very heavy electrical components can also be realized. For instance, the multilevel power converter may be a three-phase multilevel power converter. This three-phase multilevel power converter may feature three first vehicles, each of the three first vehicles respectively carrying the first electrical components assigned to a phase.

Disclosed, furthermore, is a reactive-power compensation system with a modular multilevel power converter according to one of the variants described above.

Disclosed, furthermore, is a method for influencing electric current by means of a modular multilevel power converter in which the electric current is transmitted from a power-transmission network to first electrical components and to second electrical components, the first electrical components being arranged on a first vehicle, in particular on a first truck trailer, and the second electrical components being arranged on a second vehicle, in particular on a second truck trailer, and the first electrical components and the second electrical components being constituent parts of the modular multilevel power converter, and the electric current is influenced by the modular multilevel power converter with the participation of the first electrical components and of the second electrical components.

This method may have been configured in such a way that the electric current is influenced in such a manner that a reactive-power compensation of the electric current is carried out. It is accordingly a question of a method for reactive-power compensation of electric current by means of a modular multilevel power converter.

The described multilevel power converter and the described method have the same or similar advantages.

BRIEF DESCRIPTION OF THE SEVERAL VIEWS OF THE DRAWING

In the following, the invention will be elucidated in more detail on the basis of exemplary embodiments. Identical reference symbols refer to identical or identically-acting elements. Represented are.

DESCRIPTION OF THE INVENTION

Figure 1:
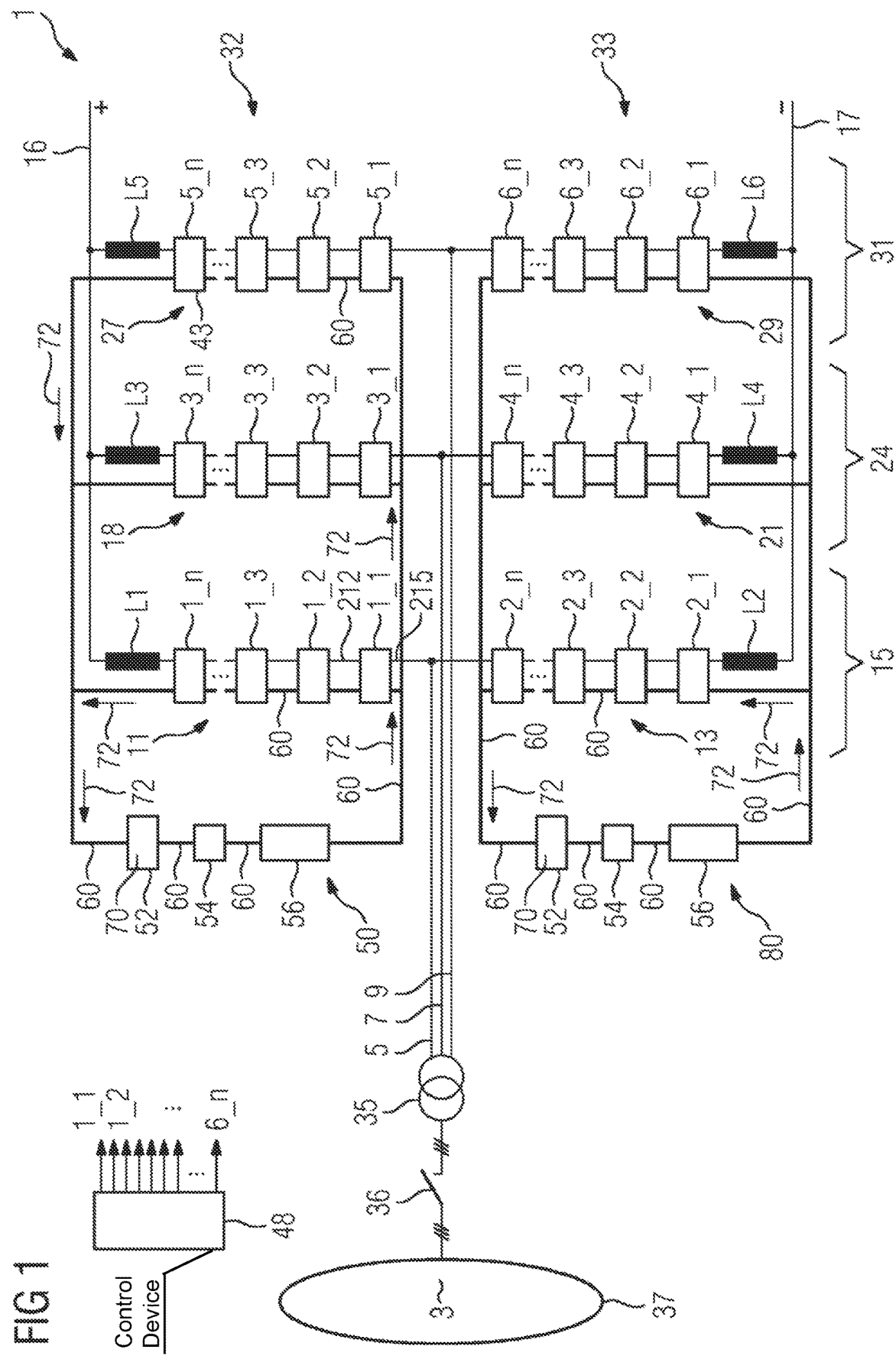
FIG. 1 an exemplary embodiment of a modular multilevel power converter in a bridge circuit, FIG. 2 an exemplary embodiment of a module, FIG. 3 a further exemplary embodiment of a module, FIG. 4 an exemplary embodiment of a reactive-power compensation system with a modular multilevel power converter, FIG. 5 an exemplary embodiment of the modular multilevel power converter with six vehicles, FIG. 6 an exemplary embodiment of the first vehicle and of the second vehicle, FIG. 7 the exemplary embodiment of the first vehicle in a different view, FIG. 8 an exemplary embodiment of the interface, FIG. 9 the exemplary embodiment of the interface in a partially cut-away view, and FIG. 10 the exemplary embodiment of the first vehicle and of the second vehicle in a view from below.

In FIG. 1 a power converter 1 (high-voltage power converter 1) is represented in the form of a modular multilevel power converter 1 (modular multilevel converter MMC). This multilevel power converter 1 exhibits a first AC-voltage connecting lead 5, a second AC-voltage connecting lead 7 and a third AC-voltage connecting lead 9. The first AC-voltage connecting lead 5 is electrically connected to a first phase-module branch 11 and to a second phase-module branch 13. The first phase-module branch 11 and the second phase-module branch 13 constitute a first phase module 15 of the power converter 1. The end of the first phase-module branch 11 facing away from the first AC-voltage connecting lead 5 is electrically connected to a first DC-voltage connecting lead 16; the end of the second phase-module branch 13 facing away from the first AC-voltage connecting lead 5 is electrically connected to a second DC-voltage connecting lead 17. The first DC-voltage connecting lead 16 is a positive DC-voltage connecting lead; the second DC-voltage connecting lead 17 is a negative DC-voltage connecting lead.

The second AC-voltage connecting lead 7 is electrically connected to one end of a third phase-module branch 18 and to one end of a fourth phase-module branch 21. The third phase-module branch 18 and the fourth phase-module branch 21 constitute a second phase module 24. The third AC-voltage connecting lead 9 is electrically connected to one end of a fifth phase-module branch 27 and to one end of a sixth phase-module branch 29. The fifth phase-module branch 27 and the sixth phase-module branch 29 constitute a third phase module 31.

The end of the third phase-module branch 18 facing away from the second AC-voltage connecting lead 7 and the end of the fifth phase-module branch 27 facing sway from the third AC-voltage connecting lead 9 are electrically connected to the first DC-voltage connecting lead 16. The end of the fourth phase-module branch 21 facing away from the second AC-voltage connecting lead 7 and the end of the sixth phase-module branch 29 facing away from the third AC-voltage connecting lead 9 are electrically connected to the second DC-voltage connecting lead 17. The first phase-module branch 11, the third phase-module branch 18 and the fifth phase-module branch 27 constitute a positive-side converter element 32; the second phase-module branch 13, the fourth phase-module branch 21 and the sixth phase-module branch 29 constitute a negative-side converter element 33.

The first AC-voltage connecting lead 5, the second AC-voltage connecting lead 7 and the third AC-voltage connecting lead 9 are electrically connected to a power-transmission network 37 via a transformer 35 and a switchgear 36.

Each phase-module branch exhibits a plurality of modules (1_1, 1_2, 1_3, 1_4 . . . 1_n; 2_1 . . . 2_n; etc.) which are electrically connected in series (by means of their galvanic current connections). Such modules are also designated as submodules. In the exemplary embodiment shown in FIG. 1, each phase-module branch exhibits n modules. The number of modules electrically connected in series by means of their galvanic current connections can be very diverse; at least two modules have been connected in series; but 3, 50, 100 or more modules, for instance, may also have been electrically connected in series. In the exemplary embodiment, n=36: the first phase-module branch 11 accordingly exhibits 36 modules 1_1, 1_2, 1_3, . . . 1_36. The other phase-module branches 13, 18, 21, 27 and 29 are constructed identically. In each phase-module branch an inductor (coil) L1 to L6 is furthermore arranged.

From a control device of the power converter 1, optical messages or optical signals are transmitted to the individual modules 1_1 to 6_n via an optical communications link (for instance, via an optical waveguide). For instance, the control device sends to the individual modules in each instance a desired value relating to the level of the output voltage that the respective module is to make available.

The described modular multilevel power converter accordingly exhibits a large number of the stated identical modules which are electrically connected in series. By virtue of the electrical series connection of the modules, high output voltages can be obtained. The power converter can be easily adapted (scaled) to different voltages, and a desired output voltage can be generated relatively precisely. Modular multilevel power converters are often employed within the high-voltage range, for instance as power converters of a high-voltage DC transmission system or as a reactive-power compensation system (reactive-power compensator).

The power converter 1 exhibits a cooling device 50. The cooling device 50 exhibits a coolant reservoir 52, a pump 54 (coolant pump 54) and a heat-transfer medium 56 (heat-exchanger 56).

The coolant reservoir 52, the pump 54 and the heat-transfer medium 56 are connected by coolant lines 60 to the individual modules 1_1 . . . 1_n, 3_1 . . . 3n, etc. of the power converter 1.

A supply of coolant 70 is located in the coolant reservoir 52. By means of the pump 54, the coolant 70 can be pumped out of the coolant reservoir 52 through the heat-transfer medium 56, through the modules 1_1 . . . 1_n of the first phase-module branch 11, and then back again to the coolant reservoir 52. The cooling device 50 consequently exhibits a coolant circuit 72. By means of the coolant circuit 72, power-semiconductor devices arranged in the modules can accordingly be cooled simultaneously.

For the purpose of cooling the power-semiconductor components of the modules of the second phase-module branch 13, of the fourth phase-module branch 21 and of the sixth phase-module branch 29, there is a further cooling device 80. This further cooling device 80 is constructed so as to be identical to the cooling device 50 of the first, third and fifth phase-module branches 11, 18 and 27. Of course, all the modules of the converter 1 may also be cooled by means of a single cooling device (that is to say, by means of a single coolant reservoir 52, a single pump 54 and a single heat-transfer medium 56). Alternatively, it is also possible to employ more than two cooling devices for the purpose of cooling the modules of the power converter 1.

Figure 2:
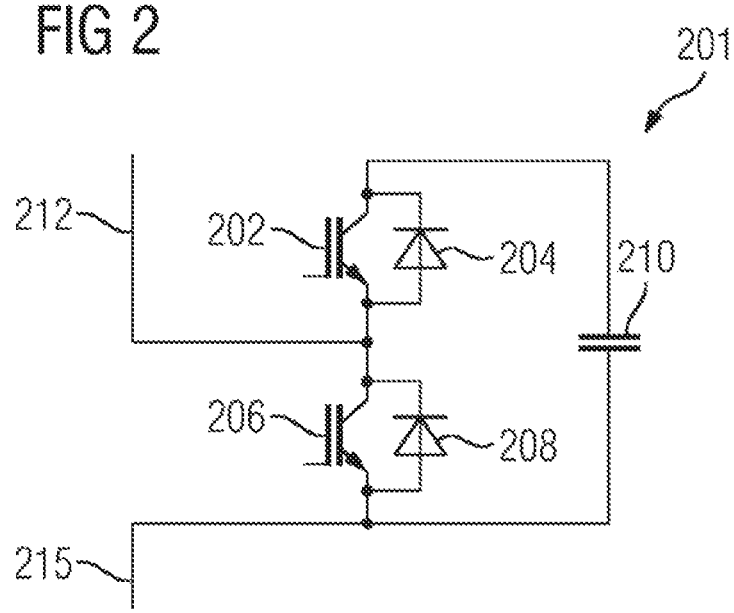

In FIG. 2 the structure of a module 201 is represented by way of example. In this case it may be a question, for instance, of module 1_1 of the first phase-module branch 11 (or of one of the other modules represented in FIG. 1). The module is configured as a half-bridge module 201. Module 201 exhibits a first electronic switching element 202 which is capable of being switched on and off, with a first diode 204 (first freewheeling diode 204) connected antiparallel. Furthermore, module 201 exhibits a second electronic switching element 206 which is capable of being switched on and off, with a second diode 208 (second freewheeling diode 208) connected antiparallel, and an electrical energy-storage device 210 in the form of an electrical capacitor 210. The first electronic switching element 202 and the second electronic switching element 206 have each been configured as an IGBT (insulated-gate bipolar transistor). The first electronic switching element 202 is electrically connected in series to the second electronic switching element 206. At the connecting-point between the two electronic switching elements 202 and 206 a first (galvanic) module-connecting lead 212 is arranged. At the connecting lead of the second switching element 206, which is situated opposite the connecting-point, a second (galvanic) module-connecting lead 215 is arranged. The second module-connecting lead 215 is furthermore connected to a first connecting lead of the energy-storage device 210; a second connecting lead of the energy-storage device 210 is electrically connected to the connecting lead of the first switching element 202, which is situated opposite the connecting-point.

The energy-storage device 210 is accordingly electrically connected in parallel to the series circuit consisting of the first switching element 202 and the second switching element 206. By appropriate drive of the first switching element 202 and of the second switching element 206, it can be ensured that either the voltage of the energy-storage device 210 is output or no voltage is output (that is to say, a zero voltage is output) between the first module-connecting lead 212 and the second module-connecting lead 215. By interaction of the modules of the individual phase-module branches, in this way the respectively desired output voltage of the power converter can be generated. In the exemplary embodiment, the drive of the first switching element 202 and of the second switching element 206 is effected by means of the (aforementioned) message or signal transmitted to the module from the control device 48 of the power converter.

Figure 3:
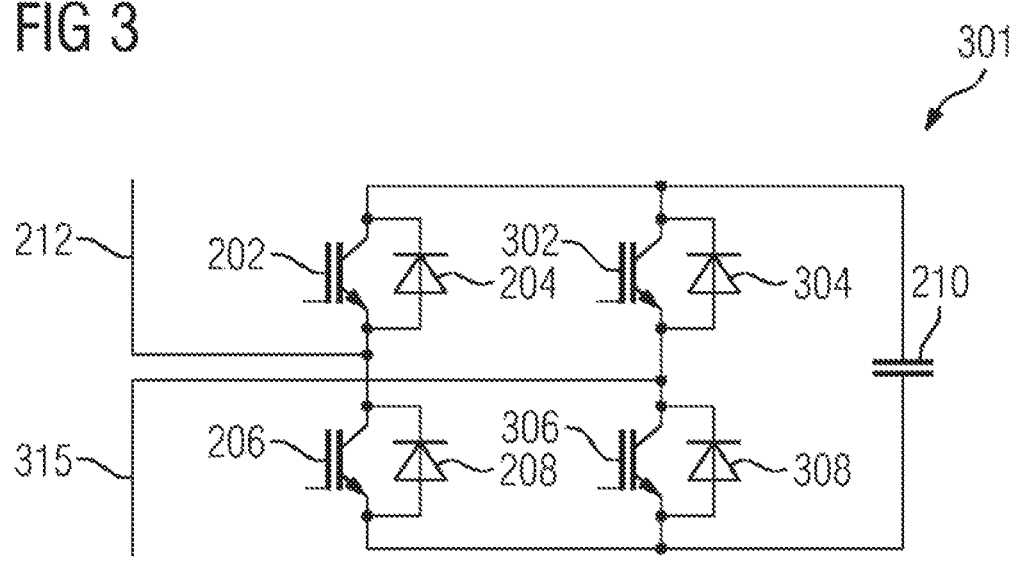

In FIG. 3 a further exemplary embodiment of a module 301 of the modular multilevel power converter 1 is represented. This module 301 may be, for instance, module 1_2 (or one of the other modules represented in FIG. 1). Besides the first electronic switching element 202, second electronic switching element 206, first freewheeling diode 204, second freewheeling diode 208 and energy-storage device 210, which are already known from FIG. 2, module 301 represented in FIG. 3 exhibits a third electronic switching element 302, with a third freewheeling diode 304 connected antiparallel, and also a fourth electronic switching element 306 with a fourth freewheeling diode 308 connected antiparallel. The third electronic switching element 302 and the fourth electronic switching element 306 have each been configured as an IGBT. In contrast to the circuit shown in FIG. 2, the second module-connecting lead 315 is not electrically connected to the second electronic switching element 206 but rather to a midpoint of an electrical series circuit consisting of the third electronic switching element 302 and the fourth electronic switching element 306.

Module 301 shown in FIG. 3 is a so-called full-bridge module 301. This full-bridge module 301 is distinguished in that, given appropriate drive of the four electronic switching elements, optionally either the positive voltage of the energy-storage device 210, the negative voltage of the energy-storage device 210, or a voltage with value zero (zero voltage) can be output between the first (galvanic) module-connecting lead 212 and the second (galvanic) module-connecting lead 315. Consequently, by means of the full-bridge module 301 the polarity of the output voltage can accordingly be reversed. The power converter 1 may exhibit either only half-bridge modules 201, only full-bridge modules 301, or half-bridge modules 201 and full-bridge modules 301.

Figure 4:
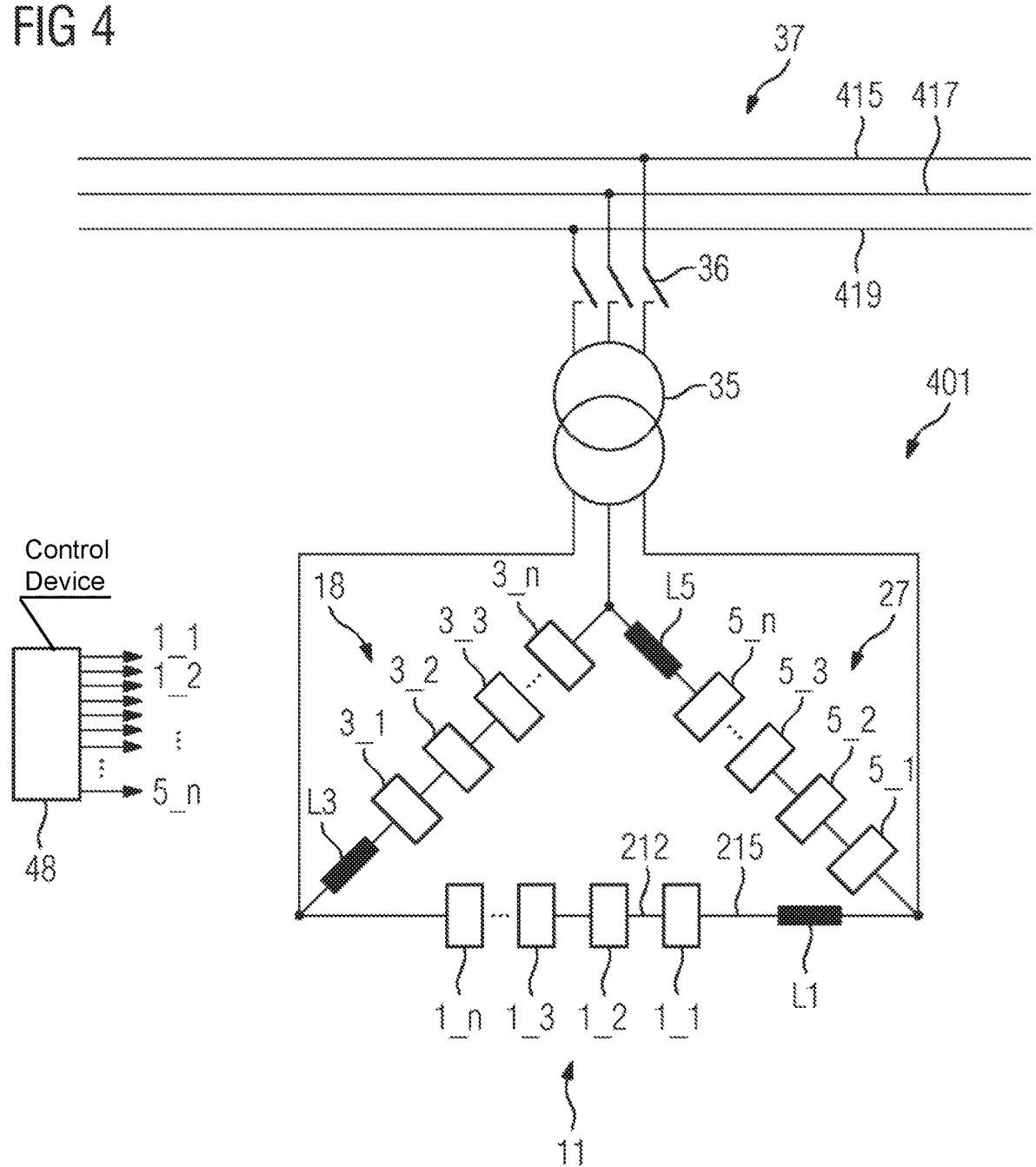

In FIG. 4 an exemplary embodiment of a power converter 401 is represented which is a reactive-power compensation system 401. This power converter 401 exhibits merely the three phase-module branches 11, 18 and 27 which constitute three phase modules of the power converter. The number of phase modules corresponds to the number of phases of an AC power-transmission network 37 to which the power converter 401 has been connected up by means of the transformer 35 and the switchgear 36.

The three phase modules 11, 18 and 27 are connected to one another in the form of a triangle—that is to say, the three phase modules 11, 18 and 27 have been connected in a delta circuit. Each vertex of the delta circuit is electrically connected respectively to a phase line 415, 417 or 419 of the three-phase AC-voltage network 37. (In another exemplary embodiment, the three phase modules may also have been connected in a star circuit instead of in a delta circuit.) The power converter 401 can supply the power-transmission network 37 with reactive power or can withdraw reactive power from the power-transmission network 37.

Figure 5:
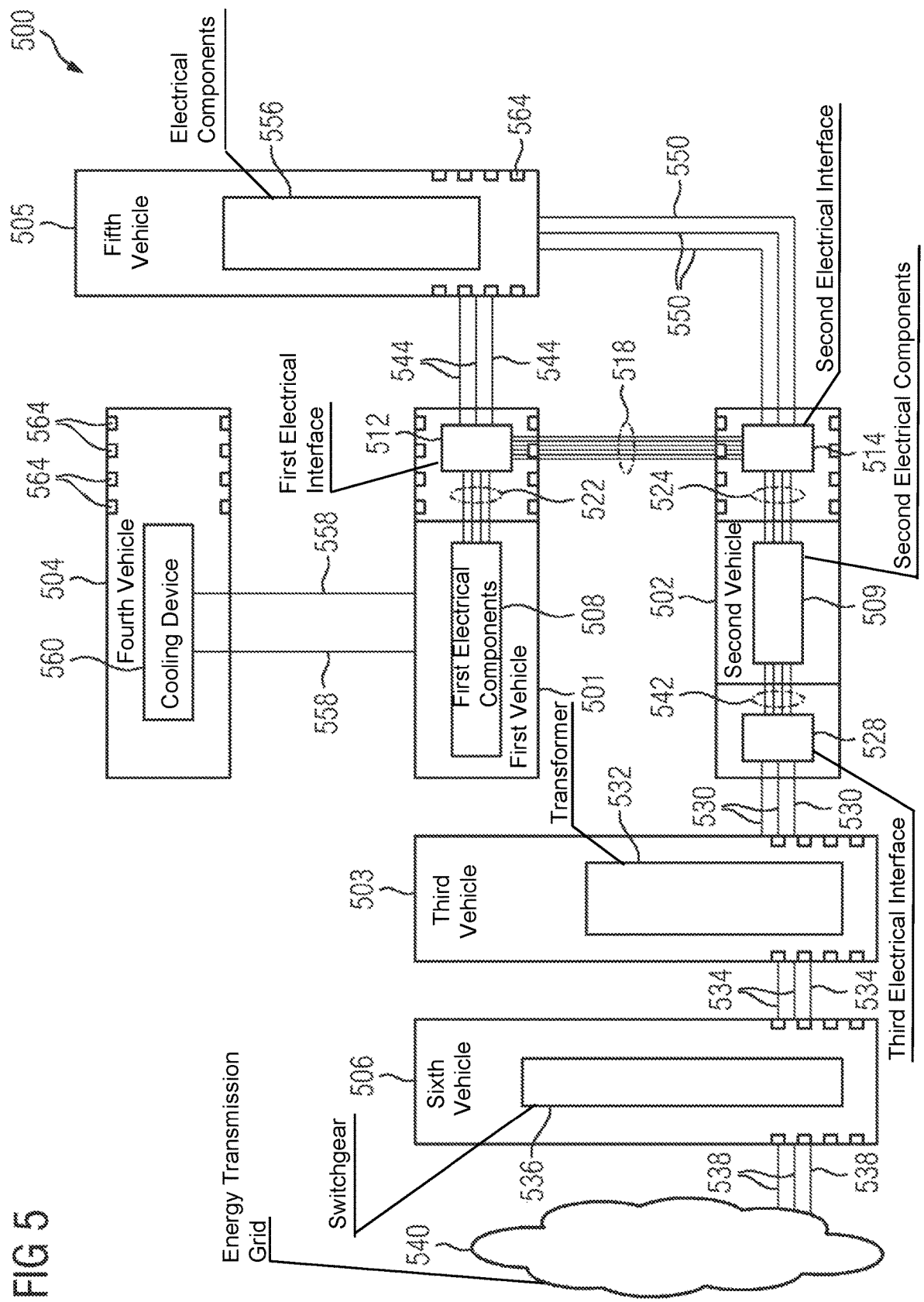

In FIG. 5 an exemplary embodiment of a modular multilevel power converter 500 is represented, the electrical components of which are arranged on six vehicles. The electrical components of the multilevel power converter 500 are arranged on a first vehicle 501, on a second vehicle 502, on a third vehicle 503, on a fourth vehicle 504, on a fifth vehicle 505 and on a sixth vehicle 506. Each of the vehicles is a truck trailer. Alternatively, however, each of the vehicles may be a different vehicle, for instance a truck equipped with an engine, or a railroad car.

First electrical components 508 are arranged on the first vehicle 501. In the case of these electrical components 508 in the exemplary embodiment it is a question of the series connections of modules 1_1 to 1_n, 3_1 to 3_n and 5_1 to 5_n, cf. FIG. 4. Second electrical components 509 are arranged on the second vehicle 502. In the exemplary embodiment, the second electrical components 509 are electrical coils (electrical chokes, choke coils, so-called phase choke coils), in particular the electric coils L2, L3 and L5 represented in FIG. 4. A first electrical interface 512 is arranged at a first end of the first vehicle 501. A second electrical interface 514 is arranged at a first end of the second vehicle 502. The first electrical interface 512 is electrically connected to the second electrical interface 514 via first connecting conductors 518.

The first vehicle 501 and the second vehicle 502 have been set up parallel to one another. The first electrical conductors 518, which connect the first electrical interface 512 of the first vehicle 501 and the second electrical interface 514 of the second vehicle 502, extend perpendicular to the first vehicle 501 and to the second vehicle 502. In this way, short conductor lengths of the first electrical conductors 518 can be realized. In another exemplary embodiment, the second vehicle 502 may also have been arranged on the other side of the first vehicle 501 (where the fourth vehicle 504 in FIG. 5 is arranged).

In the first vehicle 501 the first electrical components 508 are electrically connected to the first electrical interface 512 by means of first cables 522. In the second vehicle 502 the second electrical components 509 are electrically connected to the second electrical interface 514 by means of second electrical cables 524. Accordingly, the first electrical components 508 arranged on the first vehicle 501 are electrically connected to the second electrical components 509 via the first cables 522, the first interface 512, the first connecting conductors 518, the second electrical interface 514 and the second cables 524, the second electrical components 509 being arranged on the second vehicle 502.

The second vehicle 502 exhibits a third electrical interface 528 at its second end. The third electrical interface 528 is electrically connected via second connecting conductors 530 to a transformer 532 (more precisely, to a secondary winding of the transformer 532) which is arranged on the third vehicle 503. A primary winding of the transformer 532 is electrically connected via third connecting conductors 534 to a switchgear 536 which is arranged on the sixth vehicle 506. The switchgear 536 is electrically connected to a power-transmission network 540 (power-supply network 540) via high-voltage conductors 538. In this case, it is a question, in particular, of a high-voltage AC-voltage power-transmission network 540. It is accordingly a question of a modular multilevel power converter 500 for connecting up to a high-voltage power-transmission network 540. (Transformer 532 may be, in particular, transformer 35; switchgear 536 may be, in particular, switchgear 36; and power-transmission network 540 may be power-transmission network 37, cf. FIG. 4.) The third electrical interface 528 is electrically connected to the second electrical components 509 via third electrical cables 542.

Furthermore, the first electrical interface 512 of the first vehicle 501 is connected via fourth connecting conductors 544 to the fifth vehicle 505, more precisely to electrical components 556 which are arranged on the fifth vehicle 505. In the exemplary embodiment, these electrical components 556 of the fifth vehicle are, for instance, components of protection technology, of an uninterruptible power supply, and/or of a battery. On the fifth vehicle 505 the control device 48 of the modular multilevel power converter may optionally also have been arranged in a container installed there. But this control device 48 may also have been arranged on a different vehicle, for instance in the first container 602 of the first vehicle 501. Furthermore, the second electrical interface 514 of the second vehicle 502 is likewise electrically connected to the electrical components of the fifth vehicle 505 via fifth connecting conductors 550.

The electrical connecting conductors (that is to say, the first connecting conductors 518, the second connecting conductors 530, the third connecting conductors 534 and the fourth connecting conductors 544 and/or the fifth connecting conductors 550 may each have been realized as insulated cables or as uninsulated stranded conductors.

The first vehicle 501 is connected by means of two coolant lines 558 to a cooling device 560 which is arranged on the fourth vehicle 504. This cooling device 560 enables the cooling of the first electrical components 508 (in particular, of the modules) of the first vehicle 501. In the exemplary embodiment, the cooling device 560 exhibits heat-exchangers which have been configured to be similar to the heat-exchangers 56 shown in FIG. 1.

In the exemplary embodiment, the vehicles 501 to 506 are truck trailers in each instance. These truck trailers exhibit wheels 564 at one end; at their other end, the truck trailers are coupled onto a tractor when they are in motion. The end of the vehicles on which the wheels 564 are arranged (that is to say, the first end of the first vehicle and the first end of the second vehicle, respectively) is in each instance the rear end of the vehicle in the direction of travel; the wheel-less end of the vehicles is in each instance the front end of the vehicles in the direction of travel.

As represented in FIG. 5, the individual vehicles are parked at the site of deployment so as to be spaced apart from one another, and the structural elements or components permanently installed on the vehicles are electrically connected to one another by means of the connecting conductors. In the case of the cooling device 560 of the fourth vehicle 504, the connection is made by means of the coolant lines 558. By means of the first vehicle 501 and the second vehicle 502, the basic configuration of a modular multilevel power converter can be realized. Optionally, this basic configuration can be supplemented with the other vehicles (third vehicle 503, fourth vehicle 504, fifth vehicle 505 and/or sixth vehicle 506), in order to provide the modular multilevel power converter with further functions or properties.

From the power-transmission network 540, electric current flows via the high-voltage conductors 538, via the switchgear 536 of the sixth vehicle, via the third connecting conductors 534, via the transformer 532 of the third vehicle 503, via the second connecting conductors 530 and the third electrical interface 528 to the second electrical components 509 (here: to the coils 509) of the second vehicle 502. From there, the electrical current continues to flow via the second cables 524, the second electrical interface 514, the first connecting conductors 518, the first electrical interface 512 and the first cables 522 to the first electrical components 508 of the first vehicle 501. By means of the first electrical components 508 and the second electrical components 509, the electric current is influenced by the modular multilevel power converter 500 (in the exemplary embodiment, a reactive-power compensation of the electric current is carried out), and in this way an influence is exerted on the electrical energy transmitted in the power-transmission network 540. In other exemplary embodiments, by means of the modular multilevel power converter a different influencing of the electric current can also take place: for instance, direct current can be transformed into alternating current, or alternating current can be transformed into direct current.

The high-voltage power-transmission network has, for instance, voltages between 52 kV and 500 kV. Via the first electrical connecting conductors 518, the second electrical connecting conductors 530 and/or the third electrical connecting conductors 534, currents are preferentially transmitted at voltages within the medium-voltage range—that is to say, for instance, at voltages between 5 kV and 33 kV. Via the fourth electrical connecting conductors 544 and the fifth electrical connecting conductors 550, currents are preferentially transmitted at voltages within the low-voltage range—that is to say, for instance, at voltages between 120 V and 480 V. In addition, signals can be transmitted between all the vehicles via signal cables laid in addition to the connecting conductors.

Figure 6:
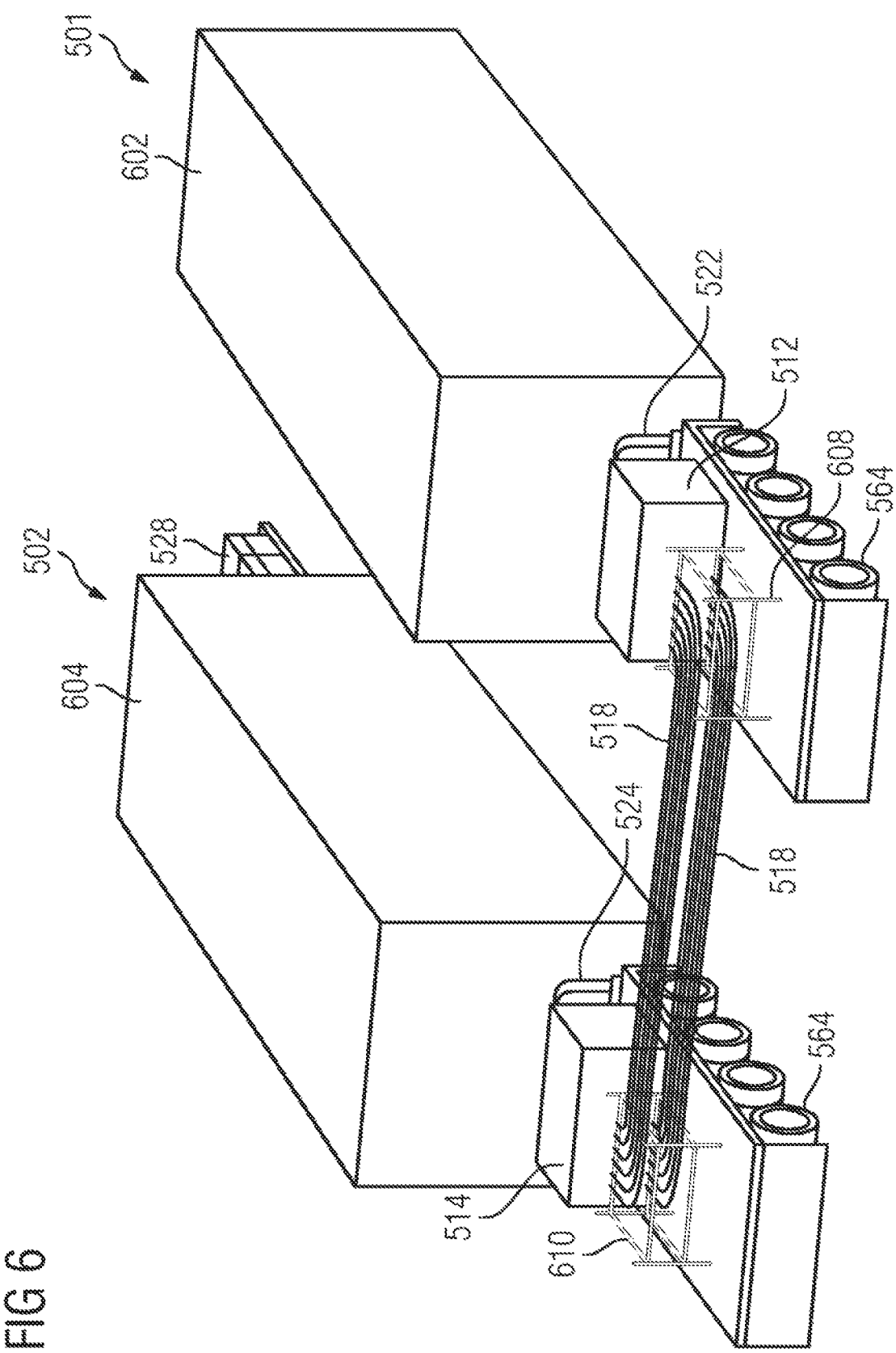

FIG. 6 shows a perspective representation of the first vehicle 501 and of the second vehicle 502. On the first vehicle 501 a first container 602 is arranged which contains the first electrical components 508. On the second vehicle 502 a second container 604 is arranged which contains the second electrical components 509. In the second container 604, besides the coils L1, L3 and L5 further components such as isolating switches and/or grounding switches may, for instance, also have been arranged. The first interface 512 of the first vehicle is electrically connected to the second interface 514 of the second vehicle 502 via the first connecting conductors 518. It can be clearly discerned that the first connecting conductors have been realized to be rectilinear in the region between the vehicles—that is to say, the first connecting conductors 518 have been laid on the shortest path between the first vehicle 501 and the second vehicle 502. For mechanical support of the connecting conductors, a first connecting-conductor support 608 and a second connecting-conductor support 610 are arranged between the first interface 512 and the second interface 514. The first connecting-conductor support 608 and the second connecting-conductor support 610 are constructed identically. Each of the connecting-conductor supports 608 and 610 has been constructed in the manner of a framework, and enables the emergence of the first connecting conductors 518 from each of the vehicles 501, 502, in each instance contrary to the direction of travel and at a right angle (+90°/−90°) to the direction of travel.

At the second end of the second vehicle 502 a part of the third electrical interface 528 can be discerned. The three interfaces 512, 514 and 528 are constructed identically.

Figure 7:
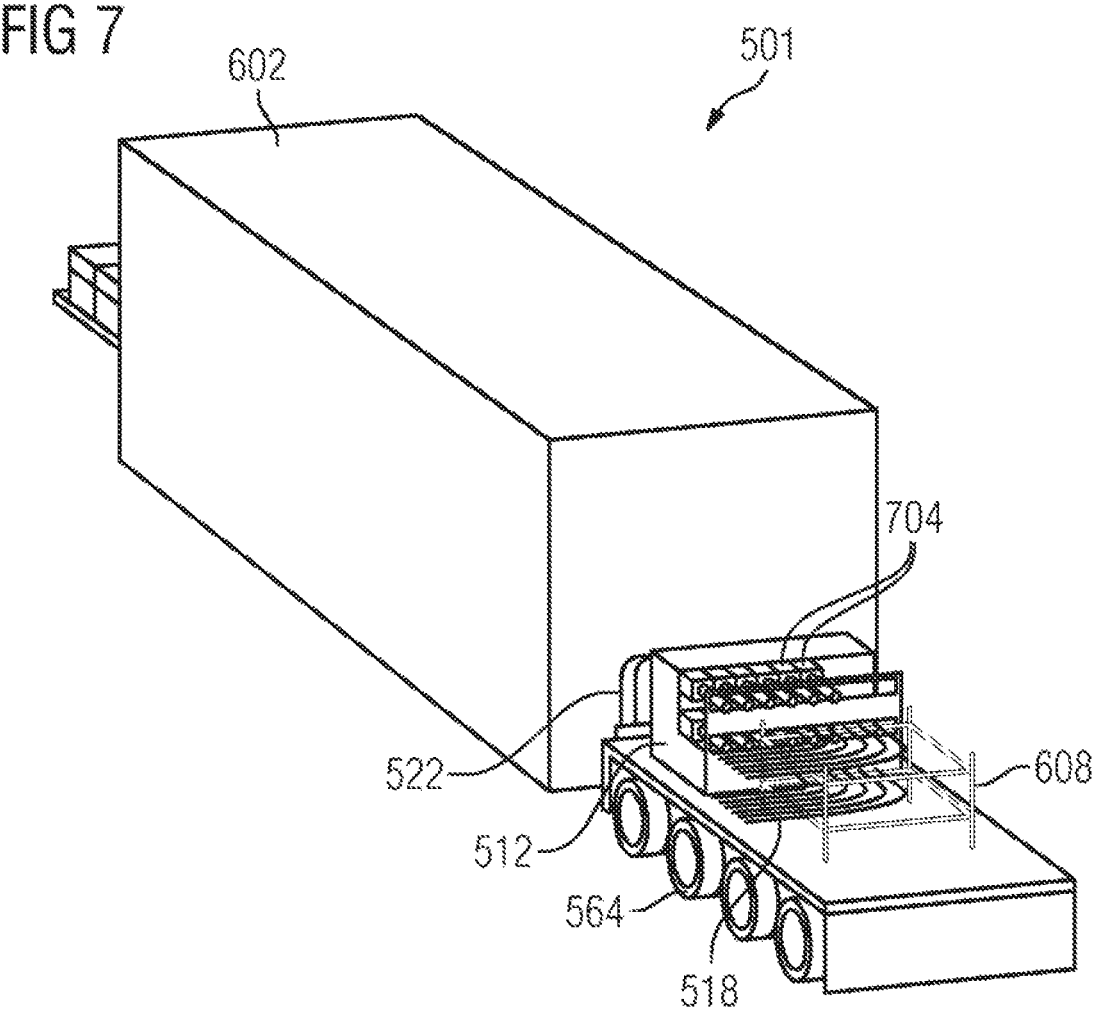

In FIG. 7 the first vehicle 501 is represented in a different view. In this case, a panel of the first electrical interface 512 has been partially removed, so that detachable electrical contact pairs 704 are visible. From each of the contact pairs 704 a first electrical cable 522 extends into the interior of the first container 602. Similarly, each of the detachable electrical contact pairs 704 is electrically connected to one of the first connecting conductors 518. (For reasons of better discernibility, the first connecting conductors 518 have not been drawn continuously as far as the first electrical interface 512, but a gap remains between the first connecting conductors 518 and the first electrical interface 512. However, in reality the first connecting conductors 518 do, of course, extend as far as the respective detachable electrical contact pairs 704.)

Figure 8:
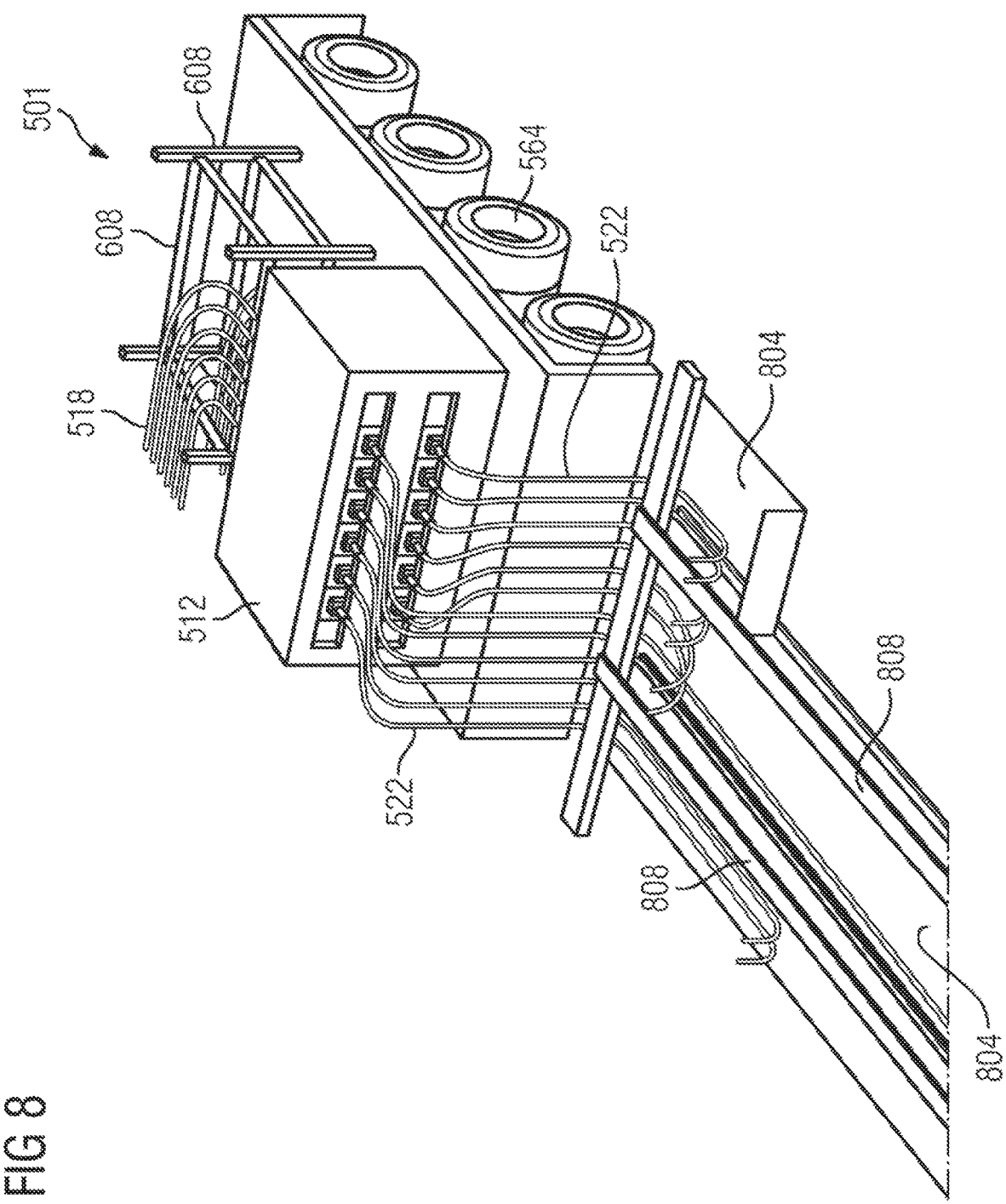

In FIG. 8 the first vehicle 501 is represented without the first container 602. As a result, the course of the first cables 522 can be clearly discerned. Starting from the first electrical interface 512, in a first section the first cables 522 firstly extend perpendicularly downward to below the first container 602. After this, in a second section the first cables 622 extend below the first container 602 along the underside of the first vehicle 501. Finally, a third section of the first cables 622 extends perpendicularly upward again. As a result, the first cables have been guided into the interior space of the first container 602 through recesses 904 (cf. FIG. 9) arranged on the underside of the first container 602.

The (second) section of the first cables 522 extending on the underside of the first vehicle 501 is protected by protective plates 804 which are arranged parallel to the bottom of the container 602 and to the bottom of the vehicle 501. The (second) section of the first cables 522 which extends on the underside of the first vehicle is located alongside or between longitudinal struts 808 pertaining to the underside of the vehicle 501 (here: longitudinal struts pertaining to the first vehicle 501 which are configured as metal profile 808, for instance in double-T shape), so that this second section of the first cables 522 is also largely protected from damage, for instance in the case where the first vehicle is placed onto an uneven road.

In FIG. 9 the first vehicle 501 is represented in a partially cut-away representation. As a result, the recesses 904 on the underside of the first container 602, through which the first cables 522 have been introduced into the interior space of the first container 602, can be clearly discerned. Furthermore, the first electrical interface 512 and two of the contact pairs 704 of this interface are represented in cut-away manner. As a result, it can be discerned that each contact pair 704 exhibits a first electrical contact 908 and a second electrical contact 910. The first electrical contact 908 is electrically connected to one of the first cables 522; the second electrical contact 910 is electrically connected to one of the first connecting conductors 518. The detachable electrical contact pairs have each been configured as a plug connector 704.

Furthermore, it can be clearly discerned that the second sections of the first cables 522 extending below the first container 602 are protected downwardly by the protective plates 804, and to the side by the longitudinal struts 808.

In FIG. 10 the first vehicle 501 and the second vehicle 502 are represented in a view from below. Once again, it can be clearly discerned here that sections of the first cables 522 extend along the underside of the first vehicle 501 and have been guided into the interior space of the first container through recesses arranged on the underside of the first container. (In the representation shown in FIG. 10, the protective plates 804 have been omitted. The vehicles may have been constructed with or without protective plates.) In the upper part of FIG. 10 it can similarly be discerned that sections of the second cables 524 extend along the underside of the second vehicle 502 and have been guided into the interior space of the second container 604 through recesses arranged on the underside of the second container 604.

Optionally, further vehicles may have been equipped with further containers, in each of which capacitors, for building up an additional reactive-power compensation by means of TSC (thyristor-switched capacitor), or coils, for building up an additional reactive-power compensation by means of TSR (thyristor-switched reactance), are arranged.

A relocatable (mobile) modular multilevel power converter has been described, especially a relocatable (mobile) reactive-power compensation system. With this, a relocatable frequency-converter system or power-converter system for reactive-power support in the electrical power-transmission network 37 can be realized, for example. Reactive-power compensation systems are particularly useful, because with them the extension of electrical power-transmission networks (new construction of additional power-transmission lines) can be put off, inasmuch as greater active powers are transmitted via the already existing power-transmission lines. However, the construction of fixed reactive-power compensation systems takes a very long time and requires lengthy advance planning, so considerable investments are necessary. In certain constellations, these investments are too high, so reactive-power compensation systems are dispensed with. As a result, the existing power-transmission networks may be overloaded, which may lead to power outages. Therefore a relocatable reactive-power compensator (reactive-power regulator) for electrical power-transmission networks is disclosed, in which the essential elements or all the elements required for reactive-power compensation are relocatable. The essential electrical components or all the electrical components (also those which are only optionally necessary for the reactive-power compensation system)—such as, for instance, power-converter valves, power circuit-breakers, power transformer, surge diverters, surge capacitor (overvoltage-protection capacitors), grounding switches, auxiliary power supply, chokes, ancillary facilities and/or heat-exchangers—are fastened to vehicles, in particular to truck trailers. In the exemplary embodiment described, the electrical components are arranged on the vehicles as follows:

first vehicle: three coil-less power-converter phase modules (that is to say, without coils: the latter are arranged in the second vehicle). Alternatively, there is the possibility of arranging each power-converter phase module in its own container on a separate vehicle. Additionally, a control-and-protection system and/or an air-conditioning system for air-conditioning of the container may optionally have been arranged in the first container 602. The modules of the electrical series circuit (in particular, the electronic switching elements of the modules) may be liquid-cooled.

second vehicle: coils (choke coils). The coils of all three phases are arranged in the second container 604 on the second vehicle 502. The second vehicle with the coils/chokes requires no external electromagnetic shielding; similarly, no safety clearance has to be complied with, because the second container substantially performs an adequate shielding. Transducers for current and voltage, a ventilation system, a control system, isolating switches, cabling and/or additional elements shielding against electromagnetic waves may optionally have been arranged additionally in the second container 604. In addition, the second vehicle may have space for expansions.

third vehicle: power transformer. A three-phase power transformer, in particular a high-voltage power transformer 532, is permanently arranged on the third vehicle.

fourth vehicle: cooling device 560. Recoolers are arranged on the fourth vehicle and flexibly connected to the first electrical components 508 of the first vehicle 501 via coolant lines 558. Space-saving V-shaped recoolers have preferentially been installed.

fifth vehicle: power circuit-breakers and other units. The power circuit-breakers and other units for all three phases are permanently arranged on the fifth vehicle. The other units may be, for instance, an uninterruptible power supply, a battery, protection technology, redundant units and/or an additional transformer. In addition, the fifth vehicle may have space for expansions, sixth vehicle: switchgear, in particular high-voltage switchgear 536.

Each vehicle is provided with a (manual or automatic) device for orienting the vehicle and for regulating the level of the vehicle with the respective container.

Further advantageous options consist in that:
all the electrical connections between the individual vehicles (in particular, the first connecting conductors 518, the second connecting conductors 530, the third connecting conductors 534, the fourth connecting conductors 544 and/or the fifth connecting conductors 550) and the associated electrical interfaces have been realized and labeled so as to be mechanically and/or visually secure against mix-up;

the high-voltage connection (in particular, the connection between the high-voltage power-transmission network 540 and the sixth vehicle 506, and also between the sixth vehicle and the third vehicle 503) can be made by means of an overhead conductor, by means of a plug/socket/cable connection or by means of a rail system;

the medium-voltage connection (in particular, the connection between the third vehicle 503, the second vehicle 502 and the first vehicle 501) can be made by means of a plug/socket/cable connection or by means of a rail system;

the low-voltage connection (in particular, the connection between the first vehicle 501 and the fifth vehicle 505 and/or the connection between the second vehicle 502 and the fifth vehicle 505) can be made by means of a plug/socket/cable connection;

signal connections (signal transmission) can be effected by means of a plug/socket/cable connection, by means of a terminal box or by means of direct wiring, depending on the local (safety) requirements.

The described modular multilevel power converter, the described reactive-power compensation system and the described method have a number of advantages or advantageous properties:

modular design (in particular, the system components have been realized as (mobile) logical units);

building approvals can be dispensed with (or have been at least greatly simplified), since all the components have been mounted in mobile transport units (containers mounted on vehicles) and can be transported and set up without great preparation;

no major infrastructure measures—such as, for example, road construction, fence construction, foundation construction, building construction, construction of rainwater-collecting systems or lightning protection—are necessary. Consequently a fast set-up is quickly possible, even on unprepared footprints in various arrangements of the vehicles;

short delivery-times: the delivery-time for an overall project is greatly shortened, since the time-intervals for installation and putting into service at the site of deployment have been greatly shortened. Moreover, by virtue of the prefabricated mobile units and the pre-planned set-up arrangement of the individual vehicles, some of the engineering outlays that would be necessary in stationary projects (in the case of fixed structures) are dispensed with;

a prefabrication of the vehicles is possible in accordance with the stipulated environmental conditions (noise, electromagnetic compatibility, radio interference, etc.);

the vehicles can be quickly and easily connected to one another by means of the connecting conductors (plug-and-play design of the connection technology); this enhances the security against mix-up and the flexibility at the time of the setting-up of the vehicles in different directions or arrangements;

all the system components, inclusive of the stowage of the ancillary equipment in the course of transportation, have been installed on vehicles. As a result, a fast and cost-effective transportation, set-up, start-up, dismantling and/or storage of the facility is made possible, and only a few approvals (if at all) are necessary. Furthermore, no special personnel with technological or control-engineering know-how are necessary at the site of deployment, since at the site of deployment the vehicles merely have to be connected by means of the connecting conductors;

a minimizing of environmental impairment (for example, noise, electromagnetic compatibility, RI) is possible by virtue of a suitable setting-up and arrangement of the vehicles, depending on the local circumstances;

there are only minor structural requirements as regards the site of deployment. As a result, a cost-saving and/or time-saving arise(s) in the course of approval procedures and/or environmental regulations (particularly since it is only a question of a temporary set-up of the facility which can later be dismantled almost without residue);

by deployment of a relatively large number of vehicles and by an appropriate distribution of the electrical components to these vehicles, relatively low and relatively high electrical power outputs can be obtained variably. For instance, reactive-power compensation systems with 25 MVAr, with 100 MVAr, with 400 MVAr and even beyond are conceivable;

the modular design enables the expansion of the modular multilevel power converter by further system components such as, for instance, TSC or TSR for a hybrid configuration;

the modular design also enables a partly mobile and partly stationary structure of the facility (for example, in the course of modernizations, expansions of the facility, or in the event of damage caused by environmental influences, individual parts of the facility can be realized so as to be mobile (that is to say, on vehicles), with other stationary parts of the facility continuing to be utilized.

A modular multilevel power converter has been described that can be easily be brought to the desired site of deployment by means of several vehicles and is operational at this site of deployment in an extremely short time. During operation, the electrical components of the multilevel power converter remain on the respective vehicles and are electrically connected to one another by electrical connecting conductors.

The invention claimed is:

1. A modular multilevel power converter, comprising:
first electrical components arranged on a first vehicle;
second electrical components arranged on a second vehicle;
said first vehicle and said second vehicle being spaced apart from one another; and
a plurality of first connecting conductors electrically connecting said first electrical components and said second electrical components to one another.

2. The modular multilevel power converter according to claim 1, wherein said first vehicle is a first truck trailer and said second vehicle is a second truck trailer.

3. The modular multilevel power converter according to claim 1, wherein:
said first electrical components comprise a series connection of modules, each of said modules having at least two electronic switching elements and an electrical energy-storage device; and
said second electrical components comprise at least one electrical coil.

4. The modular multilevel power converter according to claim 3, wherein:
said at least two electronic switching elements of said modules are connected in a half-bridge circuit; or
each of said modules has said at least two electronic switching elements and two further electronic switching elements, said at least two electronic switching elements and said two further electronic switching elements being connected in a full-bridge circuit.

5. The modular multilevel power converter according to claim 1, wherein:
said first electrical components are arranged in a first container which is fastened to said first vehicle; and/or said second electrical components are arranged in a second container which is fastened to said second vehicle.

6. The modular multilevel power converter according to claim 1, further comprising:
a first electrical interface for connecting up said plurality of first connecting conductors, said first electrical interface being arranged at a first end of said first vehicle; and/or
a second electrical interface for connecting up said plurality of first connecting conductors, said second electrical interface being arranged at a first end of said second vehicle.

7. The modular multilevel power converter according to claim 6, wherein:
said first electrical interface comprises a plurality of detachable electrical contact pairs, each of said plurality of detachable electrical contact pairs of said first electrical interface having a first electrical contact electrically connected to a respective one of said plurality of first electrical components and a second electrical contact electrically connected to a respective one of said plurality of first connecting conductors; and/or
said second electrical interface comprises a plurality of detachable electrical contact pairs, each of said plurality of detachable electrical contact pairs of said second electrical interface having a first electrical contact electrically connected to a respective one of said second electrical components and a second electrical contact electrically connected to a respective one of said plurality of first connecting conductors.

8. The modular multilevel power converter according to claim 7, wherein each of said plurality of detachable electrical contact pairs of said first electrical interface and each of said plurality of detachable electrical contact pairs of said second electrical interface is a plug connector.

9. The modular multilevel power converter according to claim 7, wherein:
said first vehicle has an underside, said second vehicle has an underside, said first container has an interior space and an underside, and said second container has an interior space and an underside;
said first electrical contacts of said first electrical interface are electrically connected to said first electrical components by way of first electrical cables which extend, at least in some sections thereof, on said underside of said first vehicle and are guided into said interior space of said first container through recesses formed in said underside of said first container; and/or
said first electrical contacts of said second electrical interface are electrically connected to said second electrical components by way of second electrical cables which extend, at least in some sections thereof, on said underside of said second vehicle and are guided into said interior space of said second container through recesses formed in said underside of said second container.

10. The modular multilevel power converter according to claim 7, further comprising:
a transformer arranged on a third vehicle;
said third vehicle and said second vehicle being spaced apart from one another; and
said transformer and said second electrical components being electrically connected to one another by way of a plurality of second connecting conductors.

11. The modular multilevel power converter according to claim 10, further comprising a third electrical interface for connecting up said plurality of second connecting conductors, said third electrical interface being arranged at a second end of said second vehicle and said plurality of second connecting conductors being connected to said third electrical interface.

12. The modular multilevel power converter according to claim 11, wherein said first electrical interface, said second electrical interface, and said third electrical interface are constructed identically.

13. The modular multilevel power converter according to claim 10, further comprising:
a cooling device arranged on a fourth vehicle;
said fourth vehicle and said first vehicle being spaced apart from one another; and
at least one coolant line connecting said cooling device and said first vehicle to one another.

14. The modular multilevel power converter according to claim 13, wherein said third vehicle is a third truck trailer and said fourth vehicle is a fourth truck trailer.

15. The modular multilevel power converter according to claim 1, wherein said first vehicle is one of two first vehicles, each one of said two first vehicles carrying said first electrical components, and wherein said two first vehicles are respectively assigned to a different phase of the multilevel power converter.

16. A reactive-power compensation system, comprising a modular multilevel power converter according to claim 1.

17. A method for influencing electric current by way of a modular multilevel power converter, the method comprising:
transmitting the electric current from a power-transmission network to first electrical components arranged on a first vehicle and to second electrical components arranged on a second vehicle, wherein the first electrical components and the second electrical components are constituent parts of the modular multilevel power converter; and
influencing the electric current by the modular multilevel power converter with the participation of the first electrical components and of the second electrical components.

18. The method according to claim 17, wherein the first electrical components are arranged on a first vehicle and the second electrical components are arranged on a second vehicle.

19. The method according to claim 17, which comprises influencing the electric current to carry out a reactive-power compensation of the electrical current.

* * * * *